United States Patent
Troubounis et al.

(10) Patent No.: US 6,773,585 B1
(45) Date of Patent: Aug. 10, 2004

(54) DEVICE FOR SEPARATING FLUIDS

(75) Inventors: George Troubounis, München (DE); Lucas Menke, München (DE); Gisbert Wünsche, Rosental-Bielatal (DE)

(73) Assignee: Meri Entsorgungstenchnik fur die Papierindustrie GmbH, Munich (DE)

(*) Notice: Subject to any disclaimer, the term of this patent is extended or adjusted under 35 U.S.C. 154(b) by 0 days.

(21) Appl. No.: 09/889,029

(22) PCT Filed: Jan. 5, 2000

(86) PCT No.: PCT/DE00/00072

§ 371 (c)(1),
(2), (4) Date: Aug. 30, 2001

(87) PCT Pub. No.: WO00/40320

PCT Pub. Date: Jul. 13, 2000

(30) Foreign Application Priority Data

Jan. 8, 1999 (DE) .......................... 199 00 280

(51) Int. Cl.[7] .................. B01D 36/04; B01D 35/027; B01D 21/02; B01D 33/21; C02F 1/24
(52) U.S. Cl. .................. 210/221.2; 210/297; 210/298; 210/305; 210/312; 210/522; 210/523
(58) Field of Search .............................. 210/221.2, 297, 210/298, 305, 312, 522, 523

(56) References Cited

U.S. PATENT DOCUMENTS 1,283,925 A * 11/1918 Salisbury
2,699,872 A * 1/1955 Kelsey
3,472,383 A * 10/1969 Daniels et al.

FOREIGN PATENT DOCUMENTS

JP 05-084407 * 4/1993
JP 05-305282 * 11/1993

* cited by examiner

Primary Examiner—Thomas M. Lithgow
(74) Attorney, Agent, or Firm—Morgan Lewis & Bockius LLP

(57) ABSTRACT

The invention relates to a fluid separating device for separating fluids and solids from a composite liquid. Said separating device comprises a channel (12) which is arranged transversely upwards with a closed lower end and an outlet (19). Said channel is provided with an axial screw conveyor (14) which is arranged in the interior. A filter tank (22) communicating with said conveyor is located above the channel (12). An inlet (32) for the composite liquid to be separated is located at the upper edge approximately in the middle of the filter tank (22). A rotation filtering device (34, 70, 92) is arranged at the free end of the filter tank (22). Said device partially dips into the fluid contained in the filter tank (22). The invention provides a means for effectively separating a composite fluid into three different fractions, the clear liquid, a sludge fraction and a particle fraction.

28 Claims, 6 Drawing Sheets

Figure 1:
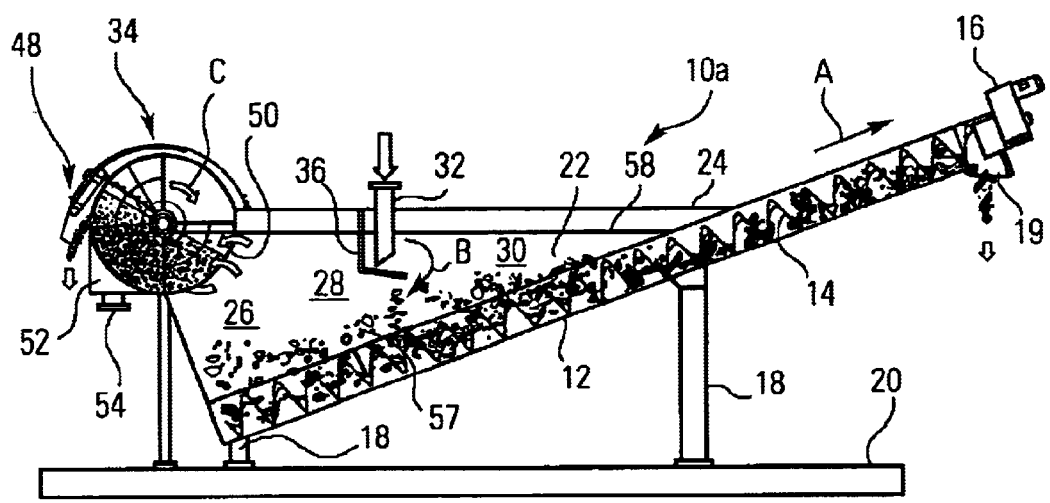

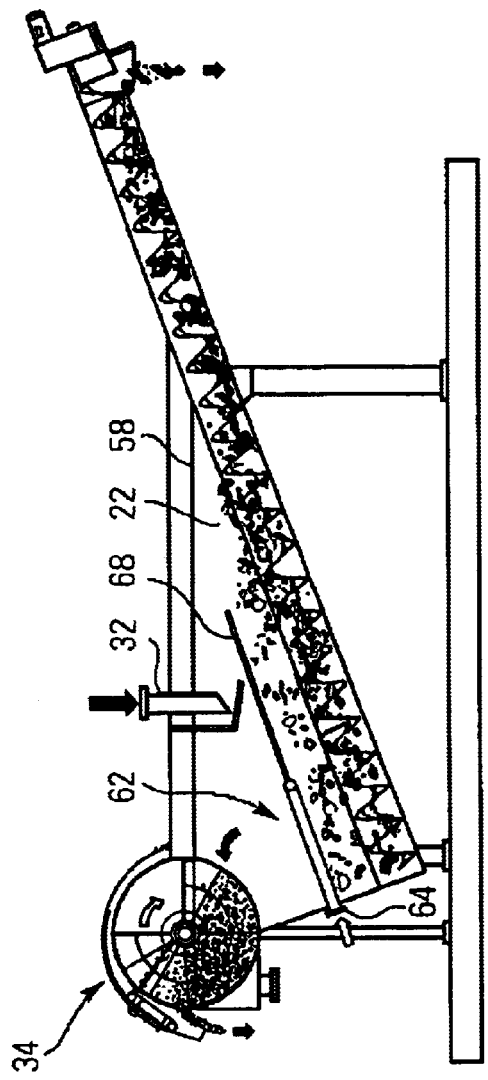
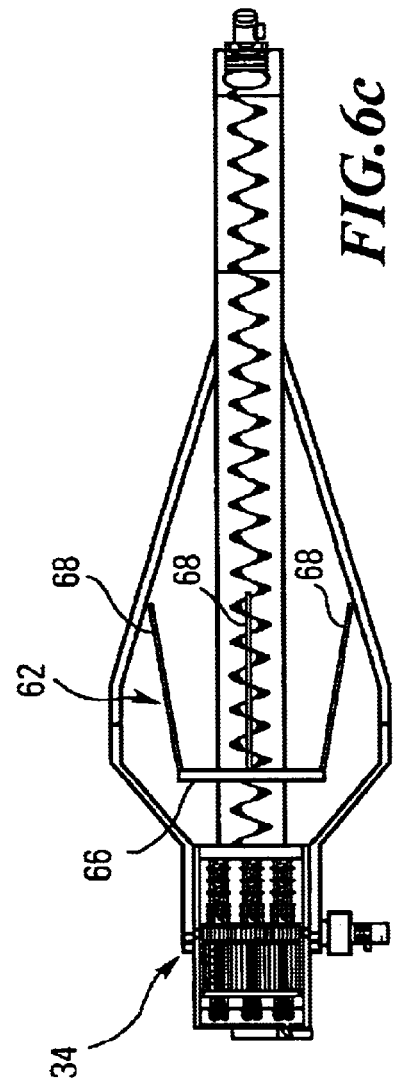
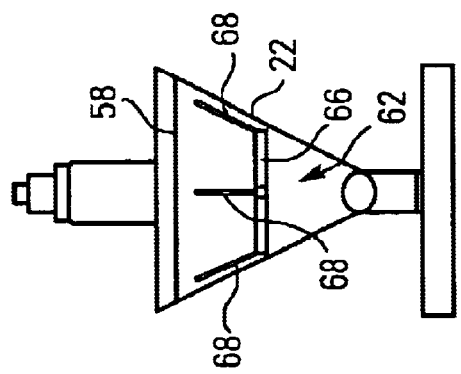

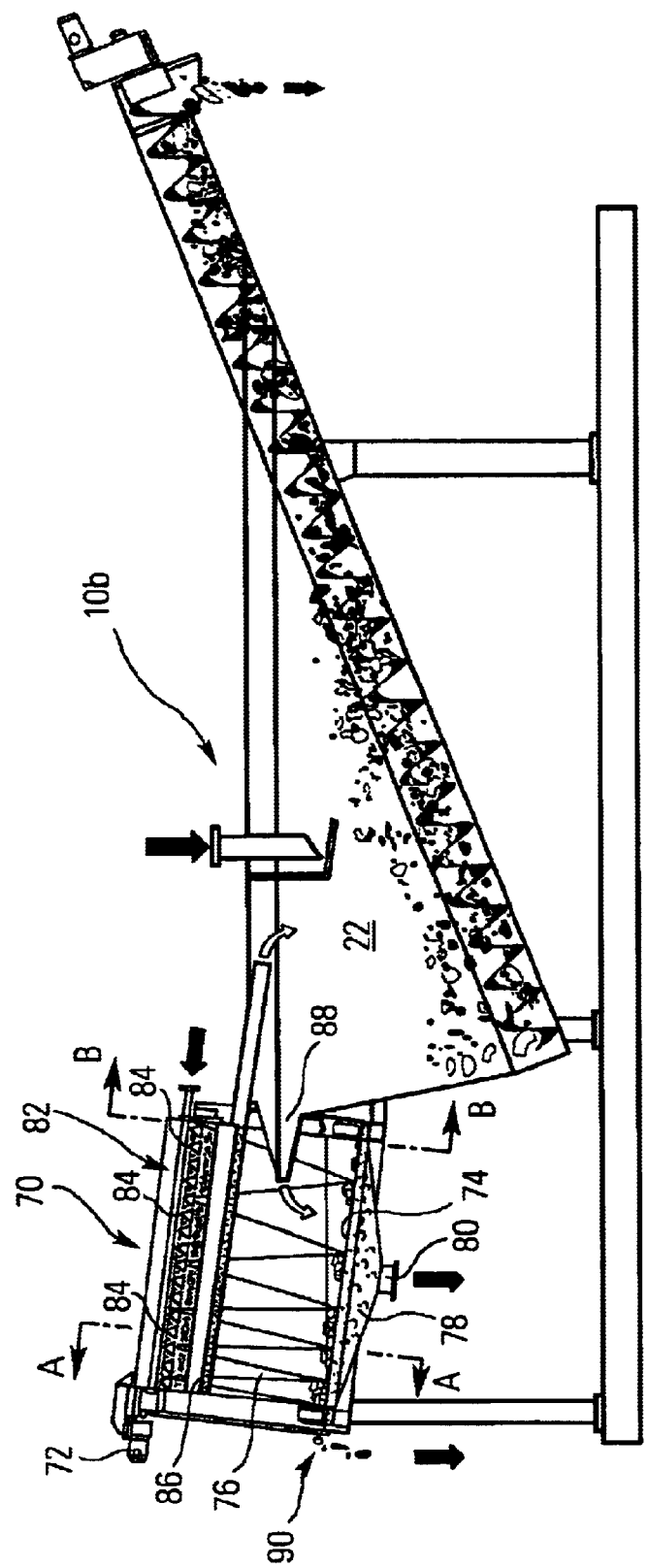
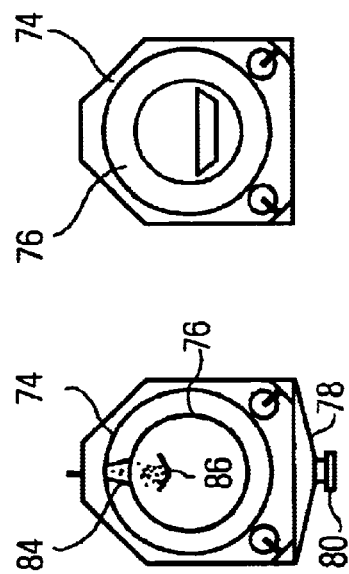
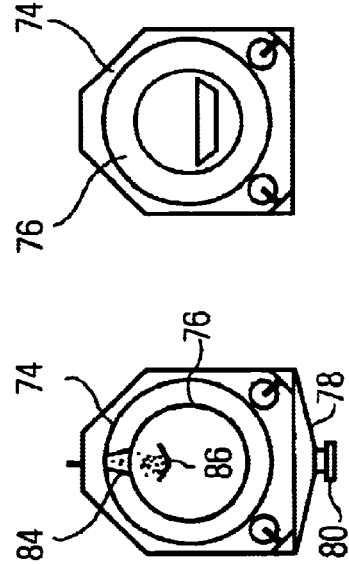
FIG.7
FIG.8a
FIG.8b

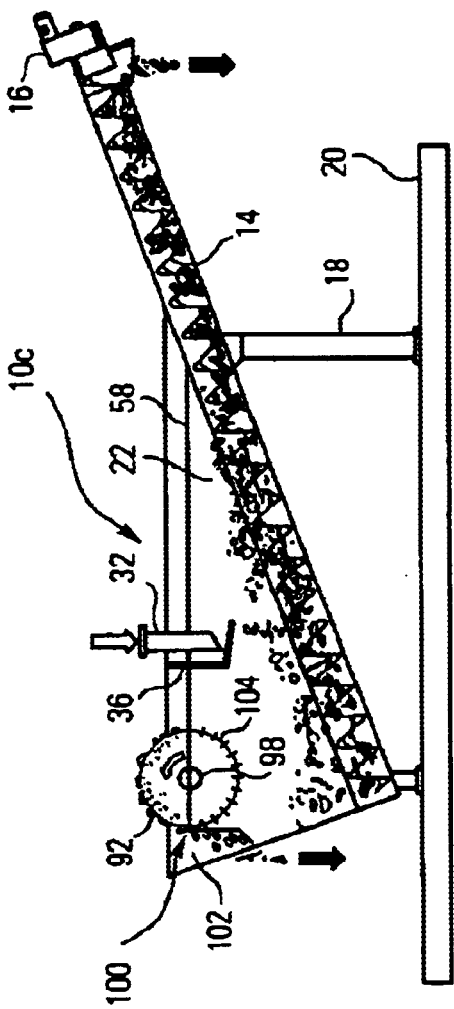
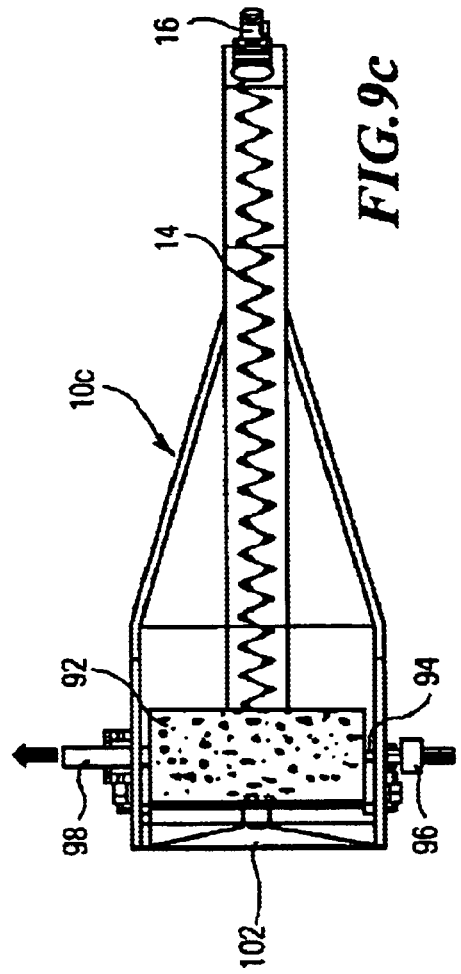
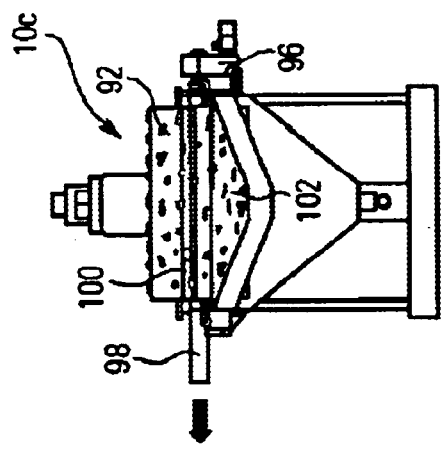

DEVICE FOR SEPARATING FLUIDS

The invention relates to a fluid separating apparatus for separating liquids and solids from a multicomponent fluid. Such apparatuses are used in water purification, pulp and sludge thickening as well as in de-ashing or fractionation, particularly in the paper industry.

Conventional fluid separating apparatuses operate according to different principles for separating the clear fluid from the various solids. The separation principle depends on the expected composition of the multicomponent fluid.

U.S. Pat. No. 4,274,963 discloses a generic separating apparatus. This apparatus is typically used for suspensions of recovered waste paper, which contain paper fibers, light contaminants (plastics, wood) and heavy contaminants (e.g., glass, sand and metal particles). Due to the specific weight difference, the heavy contaminants could actually be easily separated from the water by means of this sedimentation apparatus. The separation, however, would work only if no light contaminants were present since the fibers and plastics persistently impede or interfere with the sedimentation process. The light contaminants further form a scum layer on the open surface inside the filter tank, which would impede or even clog the inflow into the machine.

On the other hand, the light contaminants could be readily separated from the water by a so-called disk thickener. In the presence of heavy contaminants, however, e.g., sand and glass, such a disk thickener is subject to very high wear. As a result a disproportionate amount of maintenance and repair would be required and the overall life of the entire apparatus—and thus its efficiency—would be clearly reduced. In other words, the separating process is inefficient irrespective of whether an apparatus according to the generic publication is fluidically arranged in front of or behind a disk thickener.

Based thereon the object of the invention is to define a fluid separating apparatus in accordance with the preamble of claim 1, which operates without wear and effectively separates a multicomponent fluid into three different fractions, a clear liquid, a sludge fraction and a particle fraction. The aim is a high-quality separation of the multicomponent fluid into three different fractions, the clear liquid, a sludge fraction and a particle fraction.

According to the invention, this object is attained by the features set forth in claim 1. Advantageous further developments of the idea underlying the invention are set forth in the dependent claims.

Through the feature combination of claim 1, the light contaminants are continuously discharged via the rotary filter unit. This prevents the light particles from hindering sedimentation so that the heavy contaminants are reliably separated in the sedimentation space.

The invention—in contrast to prior art machines connected in series—achieves a substantially clearer separation of the two solids fractions into heavy particles (usually inorganic and suitable for disposal in landfills) and light particles (usually organic and either suitable for incineration or recyclable in the process). On the other hand the clear liquid has undergone a substantially greater degree of clarification. At the same time, the apparatus—compared to the aforementioned fictitious series connection of two individual apparatuses—is less prone to malfunctions and therefore economically more efficient.

An essential advantage of the arrangement according to the invention is that it makes it possible to separate a fluid/solid mixture into three different fractions in one compact structure. The apparatus according to the invention is configured in such a way that it rarely ever clogs or becomes inoperable. The arrangement permits a very high fluid throughput.

Figure 2:
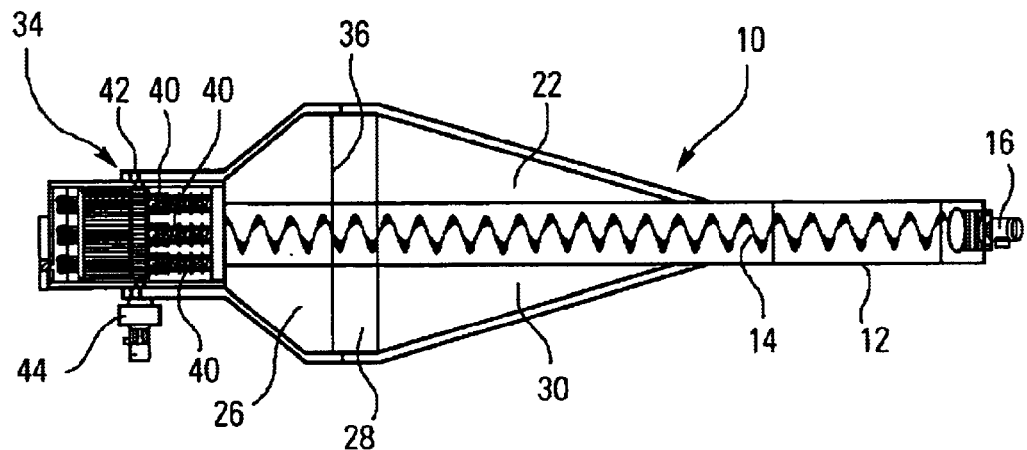
Figure 3:
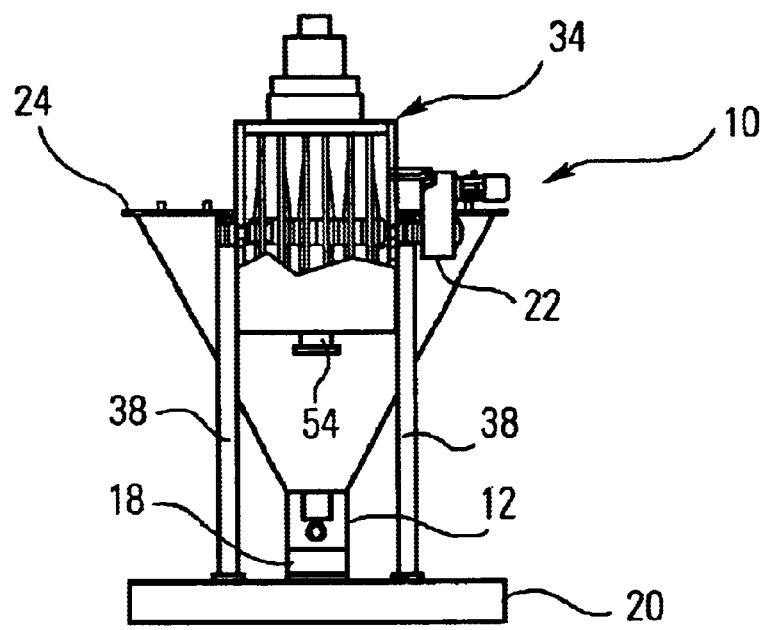
Figure 4:
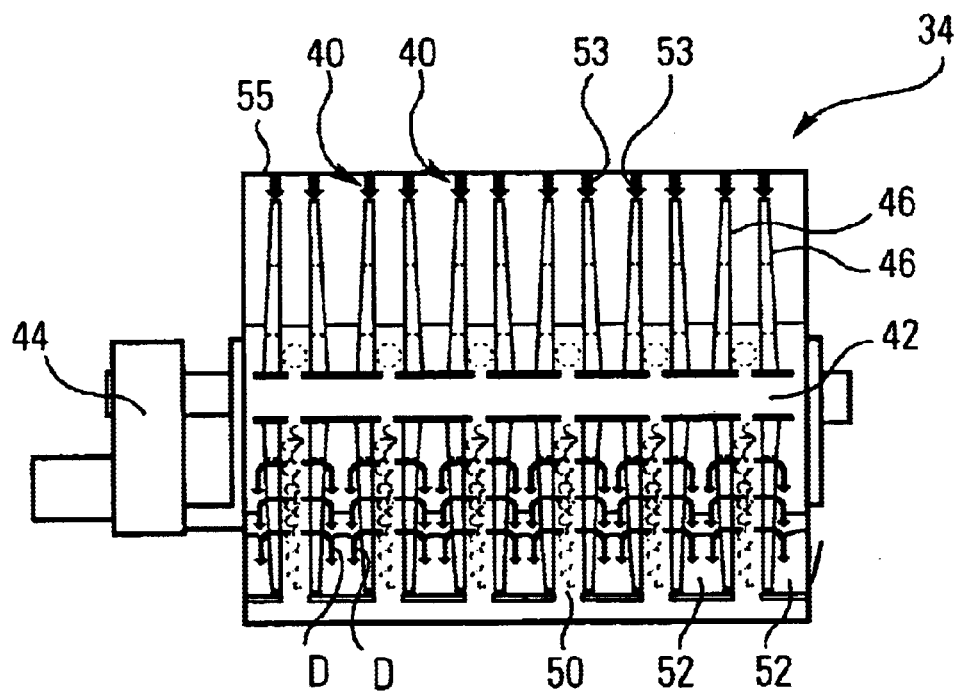

The invention and its embodiments will now be described in greater detail with the aid of the attached drawings in which:

FIG. 1 is a schematic longitudinal section through a first embodiment of a separating apparatus according to the invention, FIG. 2 is a schematic top view of the separating apparatus shown in FIG. 1, FIG. 3 is a schematic front view of the separating apparatus shown in FIGS. 1 and 2, FIG. 4 is a schematic section through a rotary filter disk arrangement as an integral component of the separating apparatus, FIG. 5 shows three schematic longitudinal sections through alternative embodiments of filter tanks with baffle arrangements, FIG. 6 shows three schematic side views of a separating apparatus according to the invention with a gas injection device, FIG. 7 is a schematic longitudinal section through a second embodiment of the invention, FIG. 8a is a schematic cross section along line A—A of FIG. 7, FIG. 8b a schematic cross section along line B—B of FIG. 7, and FIG. 9 shows three schematic views or sections through a third embodiment of the invention.

The first embodiment of a fluid separating apparatus 10a schematically depicted in three views in FIGS. 1 to 3 essentially comprises a long channel 12 inclined at an angle to the horizontal, in the interior of which a conveyor screw or conveyor spiral 14 is arranged. The conveyor screw 14 is either supported at both axial ends or simply lies in channel 12. In either case the screw is rotated by a preferably electric worm drive 16 in such a way that it acts in the direction indicated by arrow A. Channel 12 is preferably supported on a base 20 via supports 18. A solids discharge 19 is provided at the upper end of channel 12.

A filter tank 22, which appears as a triangle in the longitudinal section of FIG. 1 and has a horizontally extending upper edge 24, is mounted to channel 12. As may be seen in FIG. 3, the cross section of the filter tank 22 tapers in downward direction and is adapted to the width of channel 12. As indicated in FIG. 2, the filter tank 22 is preferably divided into three sections: a first section 26 with increasing width starting from the end, a middle section 28 with a larger, preferably about constant width, and a third section 30 with a width tapering again to the width of channel 12. Due to the downward tapering (FIG. 3), the contour described here and shown in FIG. 2 of course applies—strictly speaking—only to the upper edge 24 of the filter tank 22.

As may be seen in FIG. 1, an intake 32 for the material to be separated is provided in the upper end area of the middle section 28.

A rotary disk filter unit 34 schematically illustrated in detail in FIG. 4 is arranged in the area of end 34 of the filter tank 22 (the free corner of the triangle). This rotary disk filter unit 34 is supported on base 20 via supports 38.

Between the separation material intake 32 and the rotary disk filter unit 34 a deflector baffle 36 is furthermore provided near the separation material intake 32. It is preferably L-shaped, with a first substantially perpendicular section and a second oblique to approximately horizontal section extending in the direction of the separation material intake 32. The deflector baffle 36 is fixed to the wall of the filter tank 22 on both sides.

FIG. 4 shows a cross section of an embodiment of a rotary disk filter unit 34 which has 6 filter disk pairs 40 rather than the three shown in the embodiment of FIGS. 1 to 3.

The rotary disk filter unit 34 depicted in FIG. 4 thus comprises six filter disk pairs 40 mounted coaxially one behind the other on a rotatable shaft 42. This shaft is driven by a drive unit 44. The individual filter disks 46 of each filter disk pair 40 comprise a support structure (not depicted) to which a disk-shaped screen is mounted through which the clarified fluid can pass. An outlet 48 for the thick stock is arranged on the side opposite the intake (FIG. 1). The filter disks 46 divide the interior of the rotary disk filter unit 34 into two areas separated from one another by the screens: the intake area 50 and the outlet area 52, which opens out into the clear fluid outlet 54. To this end the filter disks 46 are sealed along their outer circumference with respect to a housing 55 by means of seals 53.

The function of the first embodiment of the fluid separating unit 10a will now be described.

The multicomponent fluid to be separated into three fractions enters the filter tank 22 via the separation material intake 32. The flow is directed away from the rotary disk filter unit 34 by deflector baffle 36 to force the fluid to take the path indicated by arrow B (FIG. 1). Heavy particles, particularly coarse sand, stones, metal particles, etc. (indicated with reference number 57) migrate downwardly into channel 22 and thus into the effective area of the conveyor screw 14 by which these components are transported upwardly in channel 12 to solids outlet 19, through which they are discharged.

Simultaneously with the downward separation of the solids, lighter, particularly fibrous material etc. rises in upward direction toward the liquid surface level 58 and moves in the direction of the rotary disk filter unit 34. In the intake area 50 of said unit, the fiber/liquid mixture, which continues to thicken, reaches the zone of influence of the rotating filter disks 46, which are driven by drive unit 44 and rotate clockwise as indicated by arrow C in FIG. 1. The rotary action causes the mixture to be increasingly entrained in clockwise direction. The liquid fraction passes through the screens in axial direction of the shaft 42 into the separate drainage area 52, as indicated by arrows D in FIG. 4. The clarified liquid finally exits through the clear fluid outlet 54 toward the outside.

Due to the increasing removal of the liquid phase, the mixture remaining between the filter disks 46 continues to thicken and is finally discharged via the thick stock outlet 48.

The above-described fluid separating unit 10a according to the invention ensures excellent separation of a multicomponent mixture, which occurs particularly in the paper industry, into three separate recoverable or disposable fractions. The heavy materials, such as sand, stones, larger metal particles (e.g., staples) etc. form the first heavy particle fraction. The fibrous and mineral materials together with fine sand, other smaller particles (e.g., organic particles with a lower density than water, such as expanded polystyrene) form the second thickened sludge fraction, and the filtered fluid, preferably water, forms the third clear fluid fraction. The composition between the first and the second fraction can be varied within certain limits depending on surface selection and residence time.

Figure 5A:
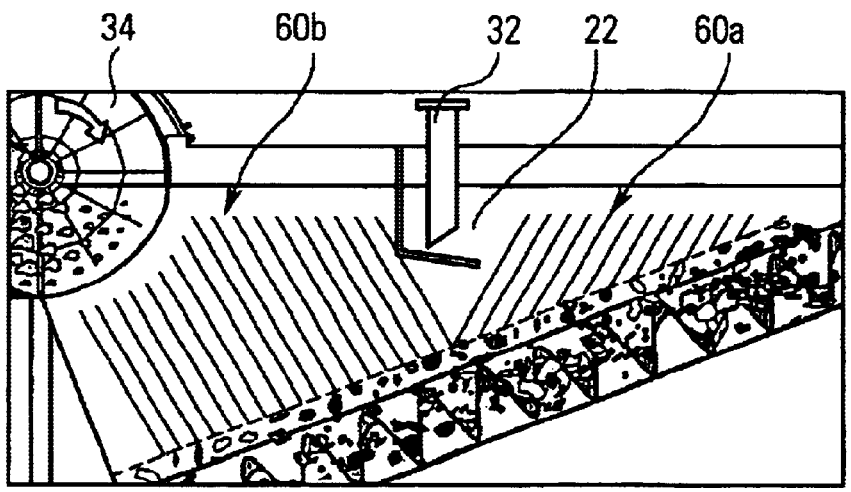
Figure 5B:
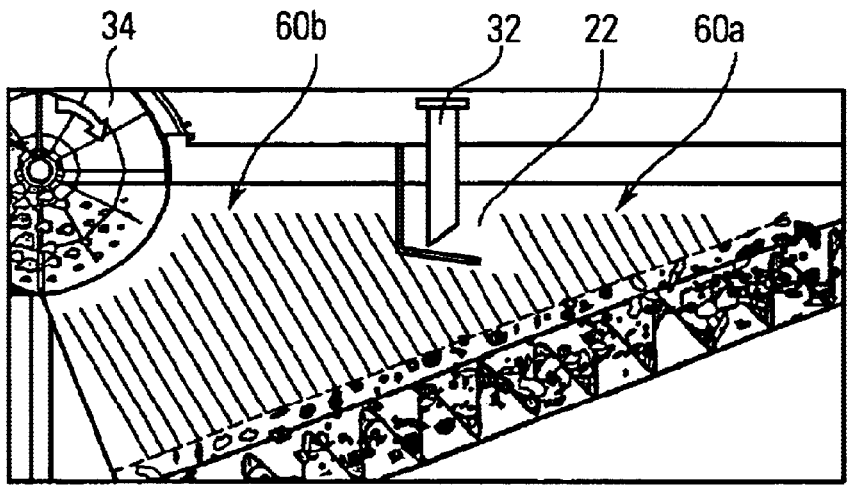
Figure 5C:
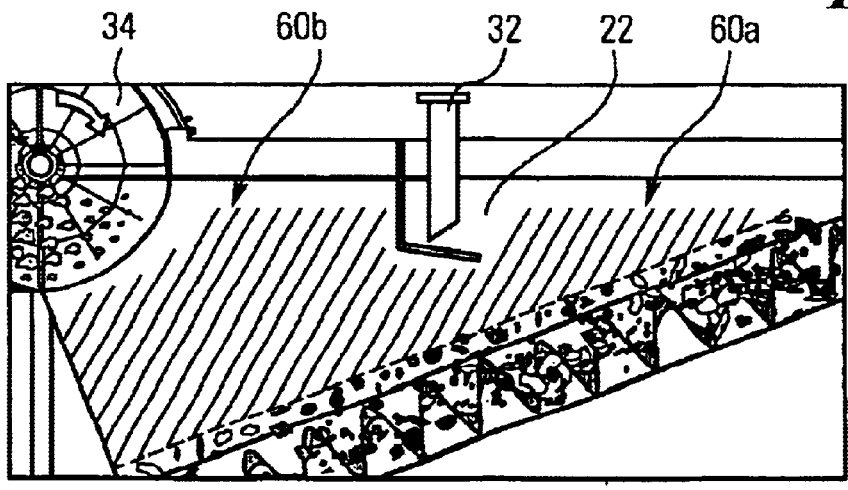

FIGS. 5a to 5c show three further developments of the invention in which a plurality of parallel, spaced-apart baffles 60 are provided inside the filter tank 22. These baffles preferably take up the entire width of the filter tank 22, i.e., they are mounted to the sidewalls (not depicted) on both sides of the filter tank 22. At the top, these baffles 60 go almost up the open liquid surface level 58 within the filter tank 22 and below reach up to near the conveyor screw 14. The baffles 60 define the path of the material to be separated. In particular, the multicomponent fluid is first guided in downward direction through a first group of baffles 60a to the conveyor screw 14 and then, downstream from the separation material intake 32 is guided through a second group of baffles 60b in the direction of the rotary filter unit 34. Depending on the path to be defined for the fluid flow, the variant shown in FIGS. 5a, 5b or 5c is selected.

FIGS. 6a to 6c depict a further development of the invention in a schematic cross section, a longitudinal section and a top view. This further development is distinguished by a gas injection unit 62, which essentially comprises a gas inlet 64, an approximately T-shaped supply line 66, and three injection lines 68 protruding approximately in the shape of a W. A plurality of injection nozzles is arranged in the injection line 68 to direct a gas, preferably compressed air, into the filter tank 22 and thus to accelerate and enhance the separation process between coarse and heavy solids and fine particles. The fine gas bubbles that form attach themselves to the small particles and carry them to the liquid surface level 58.

A second embodiment of the invention is depicted in FIGS. 7 and 8. This second embodiment of a fluid separating unit 10b is identical to the first with respect to the parts carrying identical reference numbers. It is distinguished only by the fact that it has a first embodiment of a drum filter unit 70 instead of the rotary disk filter unit 34 (FIGS. 1 to 6).

This drum filter unit 70 essentially comprises a screening drum 74, which is driven by a drum drive 72 and the lateral surface of which consists of a screen or fabric and is thus passable for fluids. Inside the screening drum 74 there is a conveyor spiral 76, which in the embodiment shown has a pitch decreasing in conveying direction F. A collecting basin 78 that opens into a clear fluid outlet 80 for the purified fluid is provided below the screening drum 74.

A drum cleaning unit 82 comprising a plurality of cleaning nozzles 84, which spray a cleaning liquid onto the screening drum to clean it, is arranged above the screening drum 74. A cleaning liquid collecting channel 86, which collects the cleaning liquid and conveys it to the filter tank 22, is preferably arranged in the interior of the drum.

The drum filter unit 70 is charged with precleaned fluid from the filter tank 22 via a spout 88. The further developments depicted in FIGS. 5 and 6 in the form of baffles 60 and gas injection unit 62 may of course be used in this embodiment as well.

In this embodiment, the mixture previously separated from the coarse solid particles in the filter tank 22 is transported via the spout 88 into the interior of the screening drum 74. The liquid can pass through the screen aperture and is collected in the collecting basin 78 and discharged through the clear fluid outlet 80. The conveyor spiral 76 transports the solids in upward direction (identified by F) against the pitch of the drum axis. This causes them to thicken because additional liquid flows off.

These thickened solids then exit from the screening drum via a solids discharge 90.

The rotating screening drum 74 is cleaned by means of the drum cleaning unit 82 as it passes at the summit. A cleaning liquid, preferably water, is sprayed onto the screening drum 74 causing the adhering particles to flow into the collecting channel 86 and to be transported back to the filter tank 22.

FIGS. 8a and 8b show two cross sections along lines A—A and B—B of FIG. 7. The black ring is the conveyor spiral 76 with the externally attached screening drum 74. The two sections show that the conveyor spiral 76 preferably has a decreasing depth in conveying direction.

FIGS. 9a, 9b and 9c are three views or schematic sections through a third embodiment of the fluid separating unit 10c according to the invention. This embodiment is distinguished from the other embodiments 10a and 10b in that the rotary filter unit is configured as a screening drum 92 that is arranged inside the filter tank 22. In other respects, the same reference numbers identify the same components as in the previous embodiments. Although not described in detail, this embodiment can of course again be provided with the further developments described in FIGS. 5 and 6.

As shown in FIGS. 9a–c, the screening drum 92 is submerged in the filter tank 22 by about 50% below the liquid surface level 58. The screening drum 92 comprises a rotary axis 94, at the one end of which a drum drive unit 96 is provided. A clear fluid discharge tube 98 is coaxially arranged at the opposite axial end. Directly adjacent to the outer circumference of the screening drum 92, a skimming edge 100 forming part of the thick stock discharge 102 is provided at the end of the filter tank 22.

The mode of operation of this embodiment is identical to the embodiments described above except for the function of the screening drum 92. In the present embodiment, the fluid separated from the solids especially passes through the permeable lateral surface 104 in the lower submerged area of the screening drum 92 (indicated by arrows) and flows into the interior of the screening drum 92 to the clear fluid discharge tube 98. The thick stock, which especially accumulates in the area of the liquid surface level 58 cannot pass through the lateral surface 104 but is entrained in the rotary movement (counter clockwise in FIG. 9b). It is stripped off by skimming edge 100 and then reaches the thick stock discharge 102.

What is claimed is:

1. A fluid separating apparatus for separating liquids and solids from a fibrous material containing a multicomponent fluid, said apparatus comprising:
    an upwardly sloping channel with a closed lower end and an outlet at the upper end;
    an axially extending conveyor screw disposed in said channel;
    a lower part of said channel forming a tilted floor segment of a filter tank with a closed end and an open end;
    an upper part of said channel wherein the outlet projects beyond an edge of said filter tank in the closed tank end;
    a separation material intake wherein the multicomponent fluid to be separated may be introduced, centered between the open and the closed end of said filter tank; and
    a rotary filter unit disposed to be partially submerged in fluid contained in said filter tank and wherein said rotary filter unit is arranged at the open end of the filter tank; said filter tank having a width along an upper edge that increases along a longitudinal direction in a first section, remains about constant in a middle section in which the separation material intake is located, and tapers to a width of the channel in a third section.

2. The fluid separating apparatus of claim 1, wherein the channel is arranged at an angle of about 15° to 30° to horizontal.

3. The fluid separating apparatus of claim 2, wherein the channel is arranged at an angle of about 20° to horizontal.

4. The fluid separating apparatus of claim 1, wherein the filter tank has a cross section that tapers in a downward direction and has a roughly triangular shape in a vertical cross section.

5. The fluid separating apparatus of claim 1, wherein the rotary filter unit comprises a disk filter unit with a rotary shaft extending perpendicularly to the channel and comprising at least one filter disk pair, wherein a discharge area communicating with a clear fluid outlet is provided between the filter disks of a filter disk pair, and a thick stock discharge is provided on the side of the filter disk pair that is opposite an intake area.

6. The fluid separating apparatus of claim 5, wherein approximately 1 to 10 disk pairs are mounted axially one behind the other.

7. The fluid separating apparatus of claim 6, wherein approximately 3 to 5 disk pairs are mounted axially one behind the other.

8. The fluid separating apparatus of claim 5, wherein said filter disks have a mesh construction.

9. The fluid separating apparatus of claim 8, wherein said filter disks comprise a support frame and wire gauze.

10. The fluid separating apparatus of claim 9, wherein said wire gauze has two layers and comprises a coarse-meshed support fabric and a fine-meshed filtration fabric.

11. The fluid separating apparatus of claim 5, wherein said filter disks are sealed along their circumferential edge with respect to a housing.

12. The fluid separating apparatus of claim 1, wherein said rotary filter unit comprises a screening drum arranged inside the filter tank, said screening drum having a rotary axis approximately at a height of the open liquid surface level in the filter tank.

13. The fluid separating apparatus of claim 12, wherein a clear fluid discharge tube is provided concentrically to said rotary axis on at least one side.

14. A fluid separating apparatus for separating liquids and solids from a fibrous material containing a multicomponent fluid, said apparatus comprising:
    an upwardly sloping channel with a closed lower end and an outlet at the upper end;
    an axially extending conveyor screw disposed in said channel;
    a lower part of said channel forming a tilted floor segment of a filter tank with a closed end and an open end;
    an upper part of said channel wherein the outlet projects beyond an edge of said filter tank in the closed tank end;
    a separation material intake wherein the multicomponent fluid to be separated may be introduced, centered between the open and the closed end of said filter tank; and
    a rotary filter unit disposed to be partially submersed in fluid contained in said filter tank and wherein said rotary filter unit is arranged at the open end of the filter tank; said filter tank has a width along an upper edge that increases along a longitudinal direction in a first section, remains about constant in a middle section in which the separation material intake is located, and tapers to a width of the channel in a third section; wherein a plurality of parallel baffles are spaced apart from one another and arranged in groups inside the filter tank, said baffles extending from one sidewall to another.

15. The fluid separating apparatus of claim 14, wherein said baffles are inclined at an angle of about 40°–70°.

16. The fluid separating apparatus of claim 14, wherein said baffles have upper edges configured to lie below a liquid surface level and lower edges disposed above the conveyor screw.

17. The fluid separating apparatus of claim 14, wherein said baffles are provided over substantially the entire filter tank, and a first group of baffles between the separation material intake and one axial end of the filter tank is inclined in one direction, and a second group of baffles is inclined in an opposite direction.

18. A fluid separating apparatus for separating liquids and solids from a fibrous material containing a multicomponent fluid, said apparatus comprising:

an upwardly sloping channel with a closed lower end and an outlet at the upper end;

an axially extending conveyor screw disposed in said channel;

a lower part of said channel forming a tilted floor segment of a filter tank with a closed end and an open end;

an upper part of said channel wherein the outlet projects beyond an edge of said filter tank in the closed tank end;

a separation material intake wherein the multicomponent fluid to be separated may be introduced, centered between the open and the closed end of said filter tank; and a rotary filter unit disposed to be partially submerged in fluid contained in said filter tank and wherein said rotary filter unit is arranged at the open end of the filter tank; said filter tank has a width along an upper edge that increases along a longitudinal direction in a first section, remains about constant in a middle section in which the separation material intake is located, and tapers to a width of the channel in a third section;

wherein a deflector baffle is disposed adjacent the separation material intake and opposite the rotary filter unit, said deflector baffle projecting downwardly to inhibit fluid flow from the separation material intake directly to the rotary filter unit; and wherein said deflector baffle is approximately L-shaped with an angled section directed away from the rotary filter unit.

19. A fluid separating apparatus for separating liquids and solids from a fibrous material containing a multicomponent fluid, said apparatus comprising:

an upwardly sloping channel with a closed lower end and an outlet at the upper end;

an axially extending conveyor screw disposed in said channel;

a lower part of said channel forming a tilted floor segment of a filter tank with a closed end and an open end;

an upper part of said channel wherein the outlet projects beyond an edge of said filter tank in the closed tank end;

a separation material intake wherein the multicomponent fluid to be separated may be introduced, centered between the open and the closed end of said filter tank; and a rotary filter unit disposed to be partially submerged in fluid contained in said filter tank and wherein said rotary filter unit is arranged at the open end of the filter tank; said filter tank has a width along an upper edge that increases along a longitudinal direction in a first section, remains about constant in a middle section in which the separation material intake is located, and tapers to a width of the channel in a third section;

wherein a gas injection unit is arranged in said filter tank.

20. The fluid separating apparatus of claim 19, wherein the gas injection unit has a plurality of gas injection apertures provided above the conveyor screw along sidewalls of said filter tank.

21. The fluid separating apparatus of claim 20, wherein said gas injection unit has at least three injection lines provided with spaced-apart injection nozzles and together with a transversely extending supply line form an approximately W-shaped structure, and wherein the two outer injection lines are arranged parallel to the sidewalls of the filter tank and the central injection line is arranged axially.

22. A fluid separating apparatus for separating liquids and solids from a fibrous material containing a multicomponent fluid, said apparatus comprising:

an upwardly sloping channel with a closed lower end and an outlet at the upper end;

an axially extending conveyor screw disposed in said channel;

a lower part of said channel forming a tilted floor segment of a filter tank with a closed end and an open end;

an upper part of said channel wherein the outlet projects beyond an edge of said filter tank in the closed tank end;

a separation material intake wherein the multicomponent fluid to be separated may be introduced, centered between the open and the closed end of said filter tank; and a rotary filter unit disposed to be partially submerged in fluid contained in said filter tank and wherein said rotary filter unit is arranged at the open end of the filter tank; said filter tank has a width along an upper edge that increases along a longitudinal direction in a first section, remains about constant in a middle section in which the separation material intake is located, and tapers to a width of the channel in a third section;

wherein said rotary filter unit comprises a drum filter unit with a rotating screening drum in the interior of which a conveyor spiral is mounted, the drum interior being chargable with fluid from the filter tank.

23. The fluid separating apparatus of claim 22, wherein said conveyor spiral has a decreasing pitch in a conveying direction.

24. The fluid separating apparatus of claim 23, wherein screening drum has a rotary axis at an angle to horizontal of about 5°–20° and the conveying direction slopes upwardly.

25. The fluid separating apparatus of claim 24, wherein a skimming edge adjoins a lateral surface along the exterior.

26. The fluid separating apparatus of claim 22, wherein cleaning nozzles are disposed in said rotary filter unit for cleaning the screening drum and a collecting channel, which guides the cleaning fluid into the filter tank, is arranged below said cleaning nozzles.

27. Apparatus for separating liquids and solids from a fibrous material containing multicomponent fluid, comprising:

a filter tank having an open end and a closed end with a tilted floor segment;

an upwardly sloping conveying channel having a width and forming said floor segment of the filter tank, said channel having a lower end within the tank and an upper end projecting through said filter tank closed end and beyond said filter tank to define an outlet;

an axially extending conveying screw disposed in said channel;

a materials intake disposed in a mid-section of said tank; and a rotary filter unit disposed in said filter tank open end and positioned to be partially submerged in fluid contained in said filter tank; said filter tank having a varying cross-section as viewed in a horizontal plane, the cross-section of a first section increasing from the open end to the mid-section, the cross-section of the mid-section being substantially constant, the cross-section of a third section taping back to the width of the conveying channel.

28. The separating apparatus of claim 27, further comprising a deflector baffle disposed within said filter tank with respect to said materials intake such that fluid entering through said intake is deflected away from the rotary filter unit.

* * * * *